METHOD AND APPARATUS FOR CATALYTICALLY CRACKING HYDROCARBONS

Original Filed Oct. 14, 1960 2 Sheets-Sheet 1

INVENTORS
CHARLES E. SLYNGSTAD
ROLAND L. NAGY
BY B. H. Galner
ATTORNEY
Carl A. Fernandez
AGENT

METHOD AND APPARATUS FOR CATALYTICALLY CRACKING HYDROCARBONS

Original Filed Oct. 14, 1960 2 Sheets-Sheet 2

INVENTORS
CHARLES E. SLYNGSTAD
ROLAND L. NAGY
BY B. H. Palmer
ATTORNEY
Carl W. Farnsworth
AGENT United States Patent Office Re. 25,971
Reissued Mar. 1, 1966

25,971

METHOD AND APPARATUS FOR CATALYTICALLY CRACKING HYDROCARBONS

Charles E. Slyngstad, Oakland, Calif., and Roland L. Nagy, Clifton, N.J., assignors to Pullman Incorporated, a corporation of Delaware Original No. 3,142,543, dated July 28, 1964, Ser. No. 62,731, Oct. 14, 1960. Application for reissue Feb. 25, 1965, Ser. No. 452,040
28 Claims. (Cl. 208—147)

Figure 1:
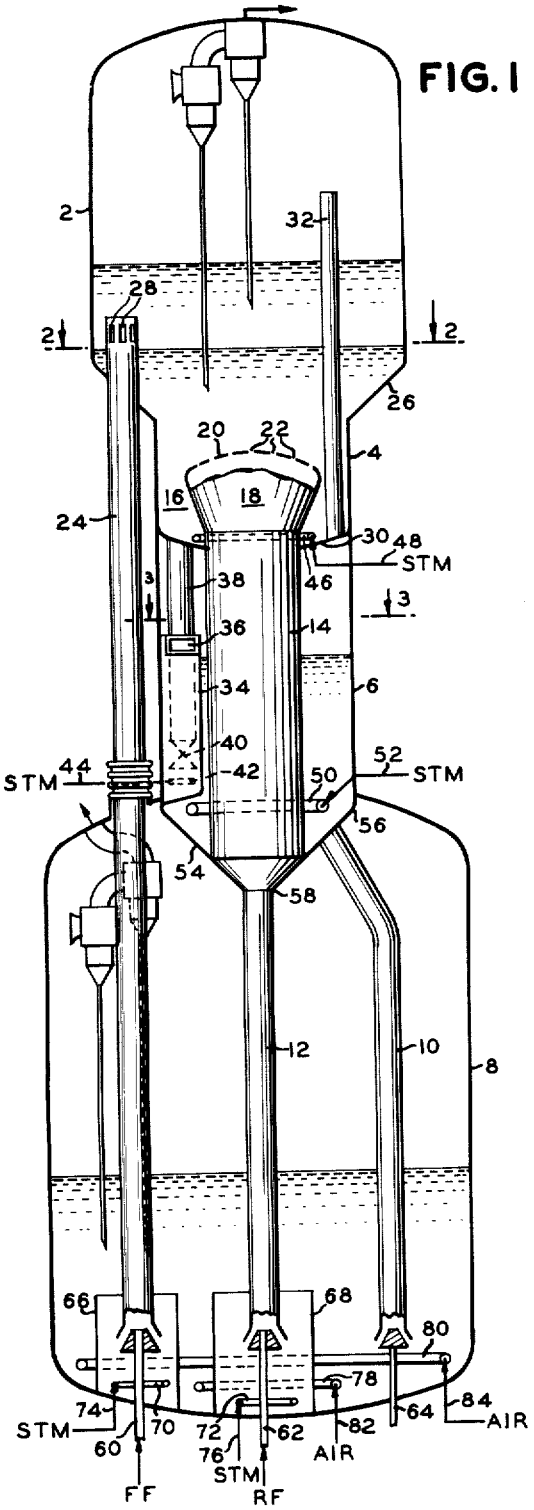
Figure 2:
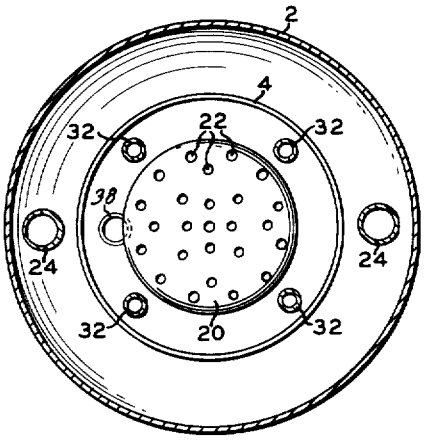
Figure 3:
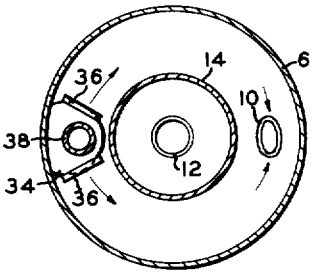
Figure 5:
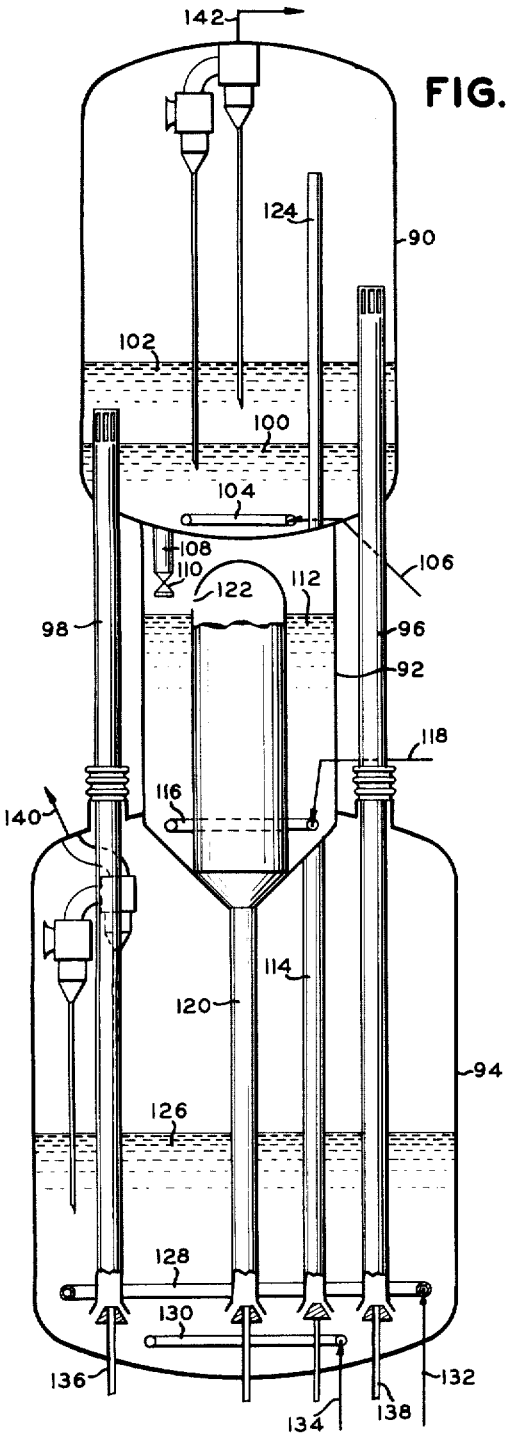
Figure 4:
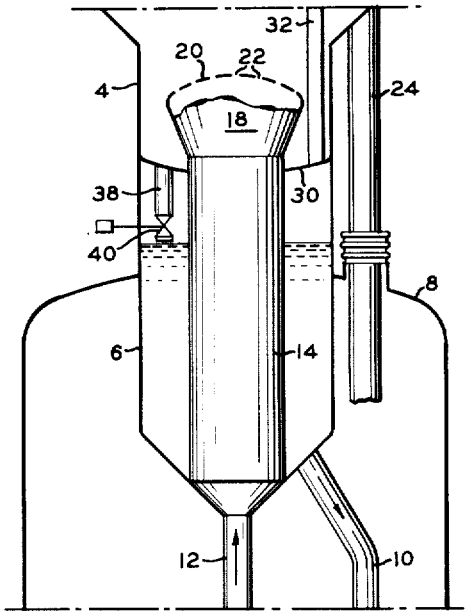

Matter enclosed in heavy brackets [ ] appears in the original patent but forms no part of this reissue specification; matter printed in italics indicates the additions made by reissue.

This invention relates to a method and arrangement of apparatus for contacting subdivided solid contact material with several different gasiform fluid materials. In one aspect the invention is directed to the segregated conversion of different hydrocarbon feed materials in the presence of finely divided fluidizable catalytic material. In another aspect the invention is directed to the method of handling finely divided catalytic material for the recovery of valuable hydrocarbon materials entrained with and adsorbed on the catalytic material.

It is an object of this invention to provide a method and an arrangement of steps for contacting at least two different vaporizable fluid reactants simultaneously in a contact system with separate portions of subdivided solid contact material under desired conditions.

Another object of this invention is to provide improved arrangements of apparatus for handling subdivided contact material which will permit conversion of different hydrocarbon reactant materials in suspended subdivided catalytic material.

A further object of this invention to provide an improved arrangement of steps for recovering valuable hydrocarbon products from catalytic material prior to passage of the catalytic material ot a subsequent regeneration zone.

Other objects and advantages of the improved method and apparatus of this invention will be more clearly evident from the following description.

In a broad aspect the improved method for contacting finely divided solid particulate material with a plurality of vaporizable or partially vaporizable materials in a cyclic system comprises maintaining an upwardly flowing suspension of said particulate material in a plurality of elongated confined contact zones disposed in substantially parallel flow arrangement, continuously discharging particulate material from the upper portion of each of said elongated confined contact zones to provide a fluid bed of particulate material of controllable depth about the upper portion of at least one of said confined contact zones, withdrawing solid particulate material downwardly as a confined stream from said fluid bed and commingling it with an upwardly flowing gasiform material to form at least a second segregated fluid bed of particulate material which moves generally horizontally through at least one elongated confined passageway, withdrawing particulate material from substantially the opposite end of said elongated confined passageway for passage as a confined stream to a third fluid bed of particulate material and passing gasiform material upwardly through said third fluid bed.

More particularly, the improved system and arrangement of steps of this invention comprises employing an elongated segregated annular stripping chamber through which a relatively dense fluid bed of contact material moves generally horizontally in conjunction with a reactor-separator chamber and prior to a regeneration chamber. The regeneration chamber is positioned so that subdivided contact material withdrawn from the regeneration chamber may be introduced with hydrocarbon reactant material into said reactor-separator chamber through a plurality of elongated confined conduits communicating between the chambers. At least one confined conduit is provided for passage of contact material from the lower portion of said reactor chamber to the annular stripping chamber; at least one confined conduit is provided for passage of gasiform material from the upper portion of the annular stripping chamber to the upper portion of the separator chamber and at least one confined conduit is provided for passing contact material from the lower portion of the segregated annular stripping chamber to a fluid bed of contact material in the regeneration chamber.

In a particular embodiment of the method described herein, catalytic material containing volatile and nonvolatile hydrocarbonaceous material is discharged from a plurality of elongated confined upflow contact zones terminating in a reaction-separation zone under conditions to form a relatively dense fluidized first bed of catalytic material in the lower portion of the reactor-separator zone superimposed by a more dilute catalyst phase. Gasiform material, either completely or partially vaporized, is introduced to the lower or bottom portion of the first bed of catalytic material to maintain it in a dense fluid-like condition. Catalytic material is withdrawn from the lower portion of said first fluid bed of catalytic material through at least one confined zone for introduction into an annular fluid bed of catalytic material herein referred to as a segregated annular stripping zone. The catalytic material passed to the segregated annular stripping zone is caused to flow in a relatively dense fluid bed condition generally horizontally through at least one elongated annular stripping zone to a catalytic material withdrawal passageway or conduit positioned in the opposite end of the elongated annular stripping zone. Gasiform stripping material is introduced to the lower or bottom portion of said segregated annular stripping zone throughout substantially the total length thereof and recovered from the upper portion of said annular fluid bed for passage as a confined stream into the upper portion of the separation zone above the reaction zone. Stripped catalytic material is withdrawn from the opposite end of the segregated annular stripping zone to which it was introduced and passed as a confined stream to a fluid bed of catalytic material in a regeneration zone.

It is contemplated in an embodiment of this invention of providing a dilute phase upflow mixing zone associated with and prior to the segregated annular stripping zone. In this particular embodiment catalytic material containing adsorbed and entrained hydrocarbonaceous material withdrawn from the first fluid bed of catalytic material in the lower portion of the reaction-separation zone is passed as a confined stream to the lower portion of an upflow dilute phase mixing zone for the recovery of entrained hydrocarbon material therefrom and the catalytic material discharged from the top of the upflow mixing zone is stripped of entrained hydrocarbons and deposited at one end of an elongated segregated annular stripping zone. It is to be understood that one or more catalyst withdrawal conduits from the first fluid bed of catalyst may be employed either alone or in association with one or more upflow dilute phase mixing zones. When employing more than one catalyst withdrawal conduits from the first fluid bed of catalytic material the segregated annular stripping zone will be divided into annular segments corresponding to the number of withdrawal conduits, such that the withdrawn catalyst may be caused to flow generally horizontally during stripping through the separate annular segments to a withdrawal conduit at the opposite end of the segment.

When employing a segregated annular stripper as herein described it is most desirable to cause the catalytic material to flow adjacent to the outer periphery of the annular stripper, thereby providing as long a path as possible within the annular stripper. Accordingly, it is contemplated maintaining the diameter of the annular stripper as large as possible and in one embodiment of this invention a riser-reactor extending upwardly through the annular stripper is enlarged in its upper portion to form a relatively large diameter segregated annular stripper in the intermediate portion of the vessel. This particular arrangement is advantageous in that is not only increases the average diameter of the segregated annular stripper, but it also maintains the annular stripper in heat exchange with at least the riser-reactor passing therethrough. Furthermore, by increasing the diameter of the riser-reactor in the upper portion there is provided an increase in the residence time of the catalytic material and reactant material in the riser-reactor by effecting a partial reduction in the vertical velocity component of the mixture passing upwardly through the riser-reactor. In addition to the above, the mass flow of the catalytic material may be caused to pass adjacent to the outer periphery of the annular stripper to maximize its path of travel by providing substantially vertically positioned baffle members within the annular stripper which extend tangentially outwardly from the inner wall of the annular stripper towards the outer wall of the annular stripper, but which terminate a sufficient distance from the outer wall to permit desired mass flow of catalytic material therebetween.

The arrangement of the individual contact chambers, communicating conduits and flow control means discussed herein provides an efficient system for carrying out the improved method of this invention and providing a system of maximum flexibility and versatility of operation. Accordingly, in a specific embodiment the apparatus of this invention comprises a unitary vessel having in combination a regeneration chamber, a reactor-separator chamber of larger diameter in the upper portion than in the lower portion and connected therewith by a downwardly sloping frusto-conical baffle member, a stripping chamber having a maximum diameter substantially the same as the diameter of the reactor chamber, coaxially positioned below the reactor chamber, but above the regenerator chamber, a first substantially vertical riser conduit extending from within the lower portion of the regenerator chamber upwardly into and terminating above the bottom of said reactor chamber to form an annular space within the lower portion thereof, said first riser conduit being of smaller diameter than said stripping chamber and forming an annular chamber therein, at least one second riser conduit extending from the lower portion of said regenerator chamber substantially vertically upwardly into said separation chamber through said downwardly sloping frusto-conical baffle member, said first riser conduit being capped at its upper end with an inverted dish-shaped perforated baffle member and said second riser conduit being capped at its upper end with discharge means adapted to deflect discharge material outwardly from a vertical direction, at least one substantially vertical standpipe extending downwardly from the bottom of said annular section into said annular chamber, at least one open end vent conduit extending from the top of said annular chamber into the upper portion of said separator chamber, at least one conduit extending downwardly from the lower portion of said annular chamber into the lower portion of said regenerator chamber, a hollow stem vertically movable plug valve aligned with the bottom open end of each of said riser conduits, valve means for controlling flow of contact material in said standpipe and a vertically movable plug valve aligned with the bottom open end of said conduit communicating between said annular chamber and said regeneration chamber.

The improved apparatus of the invention described herein is designed to provide for a structurally sound apparatus which will withstand heat stresses imposed upon the vessel, as well as to facilitate fabrication of the vessel. Accordingly, the relationship of the annular stripper chamber with respect to the regenerator chamber may be arranged so that a portion of the outside vertical cylindrical wall of the stripper is extended into the regenerator chamber a sufficient distance so that an inverted dish-shaped baffle forming the top of the regenerator chamber may be rigidly attached to the wall of the stripper above the juncture of the stripper cylindrical wall with a frusto-conical baffle member forming at least the bottom of the annular stripper chamber. It is contemplated in another embodiment of this invention, depending upon the diameter of the regenerator chamber employed, of positioning a major portion of the annular stripper chamber within the upper portion of the regenerator chamber, thereby substantially reducing the overall height of the vessel, as well as providing the annular stripper chamber in indirect heat exchange with the upper portion of the regenerator chamber.

It is to be understood that the improved system and method of operation of this invention may be adapted to various arrangements of apparatus and in this respect it is contemplated positioning the regenerator chamber beside a unitary vessel comprising the reactor-separator chamber with the annular stripping chamber positioned intermediate thereof, for example, beneath the regenerator chamber. In any of these arrangements suitable connecting conduits will be provided between the regenerator chamber and the inlet of the plurality of elongated riser-reactor chambers, as well as between the reactor-separator chamber, the segregated annular stripping chamber and the regenerator chamber for transfer of finely divided contact material sequentially through the system.

Providing a refiner today with a versatile and flexible apparatus which will permit controlling the degree of conversion of a particular feed material or a variety of different feed materials simultaneously has become increasingly important, particularly when treating relatively high-boiling range feed materials, such as heavy gas oils, topped and reduced crudes. These hydrocarbon feed materials, including gas oils, residual oils and reduced crudes, not only require conversion conditions of different severity but also contain constituents which is some instances are difficult to vaporize at the temperature and pressure conditions employed during conversion thereof which contribute to operating diffculties when employing finely divided solid contact material. Non-vaporizable or liquid-like constituents present in hydrocarbon feeds contribute to the formation of relatively large agglomerants of finely divided contact material which will defluidize, sometimes making it necessary to shut down the operation. In addition, considerable difficulty has been experienced in uniformly distributing relatively high-boiling hydrocarbon feed materials on the catalyst, controlling the severity of conversion, as well as controlling the time of contact of the feed with the catalyst, such that conversion to desired low-boiling products is obtainable. Accordingly, the improved apparatus and methods of operation described herein are directed to providing a system of optimum flexibility and versatility for handling a relatively wide variety of hydrocarbon feed materials, either separately or simultaneously. A suitable gasiform diluent material may be employed with the hydrocarbon feed material, to assist in atomization or break up of the hydrocarbon feed into relatively fine droplets to obtain more suitable distribution and provide intimate contact of the hydrocarbon feed with the finely divided solid contact material employed in the system. The mixture of hydrocarbon reactant and gaseous diluent material is mixed with finely divided solid contact material withdrawn from a regeneration zone at an elevated temperature to form a suspension of solids and hydrocarbon reactant material which is passed at selected temperature conversion conditions upwardly through suitable riser-reactors terminating in the reactor-separation zone. The enlarged separation zone often referred to as a disengaging or settling zone may contain a relatively dense fluid bed of finely divided contact material in the lower portion thereof such that at least one riser-reactor may discharge into the relatively dense fluid bed of contact material in either the upper or lower portion thereof or all of the riser-reactors may discharge above the dense fluidized bed, depending upon the height or depth of the relatively dense fluidized bed of contact material maintained in the lower portion of the reactor-separation zone. It is contemplated, therefore, of terminating one or more riser-reactors in the upper portion of the separation zone with at least one riser-reactor terminating in the lower portion of the reactor-separation zone. In any of these arrangements a bed of finely divided contact material of sufficient height is maintained to provide a head of catalytic material above the withdrawal standpipe more fully discussed herein. The relatively dense fluidized bed of contact material in the lower portion of the reactor-separation zone is superimposed by a more dilute phase of relatively hot contact material discharged from the riser-reactors terminating in the upper portion of the reactor-separation zone which tends to settle out onto the upper level of the relatively dense fluidized bed of contact material therebelow. By controlling the rate of withdrawal of contact material the upper level of the relatively dense fluidized bed of contact material may be maintained at any desired level and, if desired, a substantial distance above the discharge of the lowermost riser-reactor.

Separation of products of reaction from finely divided contact material discharged from the riser-reactors is partially effected in the separation zone by substantially reducing the vertical velocity component of the discharge contact material to a sufficient low velocity so that the contact material will settle out to form a bed of contact material therebelow. Additional separation of products of reaction from contact material is effected in suitable cyclone separators arranged in the upper portion of the separation zone and provided with suitable dip-legs for passing separated contact material to the bed of contact material therebelow. Passing a relatively inert gaseous material and hydrocarbon conversion products upwardly through the relatively hot settling contact material discharged from the uppermost terminating riser-reactors also helps in the recovery of desired hydrocarbon product material from the contact material. As herein discussed a bed of contact material may be maintained in the lower portion of the reactor-separation zone such that at least one of the riser-reactors discharge into the bed and beneath the upper dense phase level thereof. When so employing the bed of contact material the hydrocarbon reactant undergoes further conversion for an extended period of contact time in the fluid bed before emerging from the upper level of the bed as products of reaction. Accordingly, the enlarged reactor-separation zone performs a dual function including conversion of hydrocarbon feed material, separation of reaction products from finely divided contact material, as well as effecting at least a partial stripping of the catalytic material discharged from the riser-reactors, as discussed herein.

In any of the embodiments herein described, it is readily apparent and significant to note that the arrangement of apparatus and sequence of process steps has been arranged to provide not only selective conversion of different reactant materials, but selected optimized conversion residence time of contact has been provided for conversion and recovery of desired products. That is, fresh feed reactant materials are contacted in the fresh feed riser-reactors for relatively short times in the range of from about 1 to about 6 seconds at optimized conversion temperatures and thereafter immediately separated to prevent overcracking, whereas more difficult materials to be cracked are provided with a longer conversion residence time within another riser-reactor and controllable over a relatively wide range by maintaining a bed of catalyst thereabove. In addition to the above, those difficultly vaporizable hydrocarbon materials adsorbed on the catalytic material are subjected to a prolonged treatment at elevated temperatures in a novel and improved arangement of stripping steps prior to passing the catalytic material to a regeneration zone.

In the apparatus of this invention the products of reaction and entrained solid contact material are discharged from the upper end of the riser-reactors through suitable openings or discharge means provided in the upper periphery thereof. The discharge means may be a plurality of elongated slots or openings in the upper periphery of the riser-reactors or a suitable deflector plate may be positioned above and spaced apart from the open discharge end of the risers. Any suitable discharge means may be employed which will alter the vertical velocity component of the suspension passing upwardly through the riser-reactors to a horizontal or preferably a downward velocity component since this will be effective to facilitate separation of suspended or entrained solid contact material from entrained reaction products when discharged into the enlarged disengaging chamber.

During conversion of the hydrocarbon feed materials, products of reaction and difficultly vaporizable hydrocarbon materials adsorbed on the contact material are removed in a sequence of steps comprising stripping and regeneration of the contact material with the extent of removal and recovery of desired hydrocarbonaceous material being dependent upon the efficiency of the arrangement or combination of steps employed.

In any of the embodiments herein described, a first bed of contact material in at least the lower portion of the reactor-separation zone is maintained in a relatively dense fluidized condition by the introduction of a first vaporizable or partially vaporizable gasiform material which may be relatively inert gas either alone or in conjunction with a relatively high-boiling hydrocarbon material at substantially the bottom thereof to give a superficial velocity in the range of from about 0.1 to about 3.0 feet per second, preferably below about 2.5 feet per second. It is preferred, however, when employing a stripping gas to use the lowest velocity which will permit maintaining the contact material in the first fluid bed in a relatively dense fluid condition. When employing stripping gas alone partially stripped contact material is withdrawn from substantially the bottom of the first fluid bed as a relatively dense first confined stream for further treatment as desired herein. In one embodiment, the upflow dilute phase mixing zone is provided in an annular zone surrounding the first confined stream to which contact material is fed to the lower portion thereof. Contact material introduced to the lower portion of the dilute phase mixing zone is passed with a second gaseous stripping material upwardly as a relatively dilute phase suspension and discharged above a relatively dense fluid annular bed of contact material in an annular segregated stripping zone positioned beneath said first fluid bed of contact material. In another embodiment the contact material passing downwardly through the first confined stream is discharged directly into the relatively dense annular fluid bed of contact material in the annular stripping zone without employing the dilute phase mixing step discussed above. In a specific embodiment hereof the lower portion of the first fluid bed is a first annular fluid bed of contact material with the second annular segregated stripping zone containing a relatively dense annular bed of contact material which surrounds a lower portion of and may be in indirect heat exchange with a coaxially positioned elongated confined reaction zone extending into the separation zone and forming said first annular fluid bed. In any of these embodiments the segregated annular stripping zone is vented in the upper portion thereof with the upper portion of the separation zone such that stripping gas and stripped products of reaction recovered from the upflow dilute phase mixing zone and/or the segregated annular dense phase stripping zone may be passed directly to the upper portion of the separation zone without passing in contact with the fluid bed of contact material in the lower portion of the separation zone. The segregated or second annular stripping zone containing a relatively dense fluidized annular bed of contact material is stripped with additional gaseous stripping material introduced to the lower portion thereof throughout substantially the total length of the annular zone as the fluid bed of contact material moves generally horizontally from one end of the annular stripper to a withdrawal means or standpipe located at the opposite end of the annular stripper zone. That is, the contact material introduced to one end of the segregated annular stripping zone is provided with a relatively long residence time therein or stripping zone in the range of from about 30 seconds to about 3 minutes as it moves generally horizontally or laterally through the annular stripper to the opposite end thereof. It is to be understood that the segregated annular stripper may be one continuous annular stripper zone substantially completely circumscribing the riser-reactor through which the contact material must move generally horizontally or may be at least two semicircular annular stripper zones with a separate inlet and outlet for each zone or a common inlet and outlet for the semicircular stripper zones. This latter arrangement will be more specifically described hereinafter.

It is known that there is always a quantity of entrained hydrocarbon remaining with the catalyst in addition to relatively high-boiling hydrocarbon material remaining adsorbed on the surface of catalytic material employed in hydrocarbon conversion processes which is relatively difficult to remove. For this reason the contact material or catalytic material employing the method of this invention is subjected to a plurality of stripping stages which will be more effective in removing entrained hydrocarbons therefrom. In addition, the plurality of stripping stages has for its purpose further decomposition or conversion of the difficulty strippable, relatively heavy hydrocarbons that remain adsorbed on the catalytic material. This improvide decomposition and stripping treatment is accompushed in part by this invention by maintaining the catalytic material during stripping under elevated temperature conditions in a range of from about 875° F. to about 1000° F. for an extended period of time. It is contemplated maintaining the annular stripper in indirect heat exchange with at least the relatively hot riser-reaction zone extending into the lower portion of the separation zone. The residence time of the catalytic material in the plurality of stripping steps will be dependent in part upon the circumference of the riser-reactor about which the annular stripper is positioned, the length of the annular stripper through which the catalytic material laterally moves, the number of annular stripping sections and the bed height maintained in the annular stripper. The time of residence or sojourn of the catalytic material in the plurality of stripping stages may be maintained in the range of from about 60 seconds to about 4 minutes. In the segregated annular stripper it is contemplated maintaining the catalyst mass velocity flowing generally horizontally through the annular stripper in the range of from about 500 to about 1000 lbs./min./square ft. The gaseous stripping material which may be employed in the method of this invention may be any suitable relatively inert stripping gas such as steam, nitrogen, carbon dioxide or combustion gases.

Having thus provided a general description of the improvide method and means of this invention, reference is now had by way of example to the drawings which present diagrammatically preferred arrangements of apparatus for practicing the improved method of this invention.

FIGURE I presents diagrammatically in elevation an arrangement of apparatus wherein the stripping sections are substantially external to the regenerator and reactor chambers.

FIGURE II presents diagrammatically a sectional view C—C of FIGURE I.

FIGURE III presents diagrammatically a sectional view B—B of FIGURE I.

FIGURE IV presents diagrammatically in elevation an arrangement of apparatus wherein the major portion of the annular stripping chamber is positioned within the upper portion of the regenerator chamber.

FIGURE V presents diagrammatically in elevation an arrangement of apparatus wherein hot freshly regenerated catalyst is passed directly into the segregated annular stripper.

Referring now to FIGURE I, by way of example, a unitary vessel is shown provided with an upper enlarged separation chamber 2, a lower reactor chamber 4 of smaller diameter in open unrestricted communication in the upper portion with the lower portion of separator chamber 2. An annular segregated stripper chamber 6 of substantially the same maximum external diameter is aligned with and positioned beneath the reactor chamber. A regenerator chamber 8 of larger diameter than the separator chamber is aligned with and positioned beneath the annular stripper chamber. A first open end conduit 10 extends downwardly from the lower portion of the annular stripper chamber to the lower portion of the regenerator chamber. A first riser conduit 12 substantially coaxially positioned within the vessel extends from the lower portion of the regenerator chamber substantially vertically upwardly into the reactor chamber and terminates above the bottom thereof. In this specific embodiment, riser conduit 12 is substantially enlarged in the intermediate portion of the vessel to form a common cylindrical wall 14 with the annular stripping chamber. The upper portion of riser conduit 12 positioned within the reactor chamber forms an annular space 16 therewith and is further enlarged in diameter gradually by a conical baffle member 18 which is capped by an inverted dish-shaped perforated baffle or grid member 20 provided with openings 22. Riser conduit 24 is provided and extends substantially vertically from the lower portion of the regenerator chamber upwardly into the separator chamber external to the annular stripping chamber. As discussed herein there may be a plurality of riser conduits 24. Riser conduit 24 enters and extends a substantial distance into the separator chamber by passing through a frusto conical baffle member 26 connecting the bottom cylindrical wall of the separator chamber with the top cylindrical wall forming the reactor chamber. The top or discharge end of riser 24 is provided with suitable discharge means which will alter the vertical velocity component of material passing upwardly through the riser to substantially a horizontal or downward component. As shown in FIGURE I the discharge means may be a plurality of elongated slots or openings 28 in the upper periphery of the riser. The reactor chamber is separated from the annular stripper chamber by a common dish-shaped baffle member 30 with the segregated annular stripper chamber being vented to the upper portion of the separator chamber by at least one open end vent conduit 32 extending through baffle 30. In the apparatus of FIGURE I a relatively long well defined by semi-cylindrical baffle member 34 extends from substantially the lower portion of the annular stripper chamber to the upper portion thereof and is provided with suitably sized discharge slots or openings 36 substantially at the top periphery of the well, as shown in FIGURES I and III. A standpipe 38 open at its upper end and communicating with the annular space of the reactor chamber extends downwardly from baffle 30 into the lower portion of the well and is substantially coaxially aligned therewith to form a second elongated annular space or dilute phase riser mixing section between the standpipe and the wall of the well. A flow control valve 40 is positioned in the lower portion of standpipe 38 for controlling the flow of material passed through the standpipe. Positioned in the lower portion of the walls is provided distributor means 42 supplied by conduit 44 for introducing stripping gas such as steam to the lower portion of the well. A distributor means or ring 46 supplied by conduit 48 is also provided in the bottom or lower portion of the annular space of the reactor chamber for introducing fluffing or fluidizing gases or vaporizable material thereto. There is also provided in the lower portion of the annular stripper chamber means shown as a distributor ring 50 supplied by conduit 52 for introducing stripping gaseous material at substantially the bottom portion thereof. The bottom of the annular stripper chamber, as well as the enlarged portion of the coaxially positioned riser 12, is formed by a single frusto conical baffle member 54 connected at its upper periphery or maximum diameter 56 to the outer cylindrical wall of the annular stripper and at its lower periphery or minimum diameter 58 to the substantially vertical conduit forming a part of riser 12. Baffle member 14 forming the inner wall of the annular stripper is also attached to baffle 54. Vertically movable hollow stem plug valves 60 and 62 are aligned with the bottom open end of risers 24 and 12 respectively and a vertically movable plug valve 64 is provided and aligned with the bottom open end of standpipe 10. Risers 24 and 12 extend upwardly from within suitable withdrawal wells open at their upper end and defined by cylindrical baffle members 66 and 68 respectively. Means 70 and 72 supplied by conduits 74 and 76 respectively are provided within the lower portion of the wells for introducing fluidizing gas thereto. Means 78 and 80 supplied by conduits 82 and 84 are also provided in the lower portion of the regenerator chamber for introduction of regeneration gaseous material thereto.

Referring now to FIGURE II a cross-sectional view C—C of the lower portion of the separation chamber shows the location of the two riser-reactors 24 diametrically positioned, grid 20 for the centrally positioned riser 12, uniformly spaced vent conduits 32 for passing gaseous material from the upper portion of the segregated annular stripper chamber to the upper portion of the separator chamber and standpipe 38 for passing subdivided contact material from the annular bed of contact material in the reactor chamber into the segregated annular stripper section.

Referring now to FIGURE III a cross-sectional view B—B of the annular stripper defined by walls 4 and 14 shows the location of standpipe 38 with respect to the upflow annular mixer defined by wall 34 and provided with a plurality of discharge slots 36 which discharge substantially horizontally into the annular chamber. Standpipe 10 is positioned opposite standpipe 38 such that catalytic material introduced by standpipe 38 and slots 36 must move horizontally through the annular stripper to standpipe 10. It is contemplated dividing the annular stripper with a suitable vertical baffle member near the catalyst inlet so that the catalytic material must pass horizontally through the annular stripper and substantially completely circumscribe the riser-reactor about which the annular stripper is positioned to a standpipe at the opposite end therof, rather than dividing the flow of the catalytic material through the annular stripper as specifically shown in FIGURE III.

Referring now to FIGURE IV a sectional view in elevation of a modification of the apparatus of FIGURE I is shown which is identified for the sake of brevity employing the identical numerals previously employed to identify corresponding components of the apparatus described in FIGURE I. It is readily apparent from a comparison of FIGURES I and IV that the major differences between the apparatus presented therein is that in the latter arrangement (1) no provision is made for an upflow dilute phase mixing zone around standpipe 38 and the standpipe discharges directly into the annular stripper bed, and (2) the annular stripping section is dropped a substantial distance into the regenerator chamber such that a major portion of the outer wall of the annular stripper is in indirect heat exchange with the upper portion of the regenerator chamber.

Referring now to FIGURE V, by way of example, a modification of the improved method and sequence of process steps incorporating the features of this invention is diagrammatically shown. In this particular arrangement a unitary vessel is provided with an upper reactor-separator chamber 90, an intermediate segregated annular stripping chamber 92, and a lower regenerator chamber 94. One or more fresh feed riser-reactor conduits 96 extend from the lower portion of the regenerator chamber substantially vertically upwardly into the reactor-separator chamber and above the upper level of a relatively dense fluid bed of catalytic material therein. One or more recycle riser-reactor conduits 98 extend from the lower portion of the regenerator chamber unwardly into the lower portion of the reactor-separator chamber. As discussed hereinbefore a relatively dense fluid bed of catalyst is maintained in the lower portion of the reactor-separator chamber having an upper level 100 below the recycle riser outlet or an upper bed level 102 above the recycle-riser outlet. Distributor means 104 supplied by conduit 106 is provided in the lower portion of the dense fluid bed of catalytic material in the lower portion of the reactor-separator chamber for introducing vaporizable and/or partially vaporizable gasiform materials thereto. Generally superficial velocities in the range of from about 0.1 foot per second to about 3 feet per second will be employed to maintain the bed of catalytic material therein in a fluid-like condition. Catalytic material containing entrained hydrocarbon product materials including difficultly vaporizable hydrocarbonaceous deposits is withdrawn from the lower or bottom portion of the fluid bed of catalytic material in the reactor-separator chamber and passed by a suitable standpipe 108 provided with valve 110 into an annular relatively dense fluid bed of catalytic material 112. As discussed herein, the fluid bed of catalytic material in the annular stripper is caused to flow generally horizontally through the elongated annular stripper to a withdrawal means or conduit positioned in the opposite end of the annular stripper. The annular stripper through which the catalytic material flows may be one continuous annular stripper through which the catalytic material must flow in a single direction or the catalytic material may flow through more than one separate semi-circular annular path to a common withdrawal means. In the specific embodiment of FIGURE V the catalytic material containing hydrocarbonaceous material flows through the annular stripper as two separate semi-circular annular paths to a common withdrawal standpipe 114. Gaseous stripping material is introduced to the lower portion of the annular bed of catalytic material by a suitable distributor means 116 supplied by conduit 118 which gaseous material passes upwardly through the dense fluidized bed of catalytic material and is recovered from the upper portion thereof.

In accordance with the improved apparatus of FIGURE V suitable means are provided for maintaining the temperature of the catalytic material in the annular stripper within a range of from about 850° F. to about 1000° F., by providing a riser conduit means 120 containing discharge slots or passageways 122 for passing hot freshly regenerated catalytic material directly into the annular bed of catalytic material and substantially adjacent to the point of discharge of catalytic material from standpipe 108. As shown in this specific embodiment the upper portion of riser 120 is enlarged to form an enlarged central chamber having a common wall with the annular stripping chamber so that the annular bed of catalytic material may be in indirect heat exchange with hot catalytic material in the enlarged central chamber. It is contemplated, however, in another embodiment of positioning riser conduit 120 so that it extends upwardly through the annular chamber without passing into or through the enlarged central chamber and terminates below the discharge of standpipe 108 so that the hot regenerated catalyst may be mixed substantially immediately with the catalytic material discharged from standpipe 102. In any of these arrangements the catalytic material containing entrained hydrocarbonaceous material is cause to flow generally horizontally as a relatively dense fluid bed through the annular stripper during decomposition of the hydrocarbonaceous material to a standpipe 114 positioned in the opposite end thereof. Gaseous stripping material introduced to the lower portion of the annular catalyst bed along with stripped hydrocarbonaceous material is recovered from the upper dense phase level and passed by one or more vent conduits 124 to the upper portion of the reactor-separator chamber similarly as discussed in connection with FIGURE I. The stripped catalytic material is passed downwardly from the end of the annular stripping zone as an aerated dense column by conduit 114 to the lower portion of a relatively dense fluid bed of catalytic material 126 maintained in the lower portion of the regenerator chamber. Oxygen-containing regeneration gas is introduced to the lower portion of the bed of catalyst in the regenerator chamber by distributor means 128 and 130 supplied by conduits 132 and 134, respectively. In the specific arrangement of FIGURE V regenerated catalyst at an elevated temperature is mixed with recycle hydrocarbon material introduced by hollow stem plug valve 136 and passed upwardly as a suspension under elevated temperature conversion conditions through one or more riser-reactors 98 terminating in the lower portion of the reactor-separator chamber. Fresh hydrocarbon feed material introduced by hollow stem plug valve 138 is mixed with hot freshly regenerated catalyst and passed as a suspension through one or more riser conduits 96 which discharge above the uppermost dense phase level of catalytic material in the reactor-separator chamber. Generally, conversion temperatures in riser 96 will be higher than those employed in riser 98, as well as in the fluid bed of catalytic material in the lower portion of the reactor-separator chamber, however, it is contemplated employing lower conversion temperatures in riser 96 than in riser 98. Suitable cyclone separators are provided in the upper portion of the regenerator chamber and the reactor-separator chamber for the separation and recovery of entrained catalyst fines from gasiform product material with the thus separated catalyst fines being returned to the fluid bed of catalyst therebelow. Regenerated flue gases are removed from the upper portion of the regenerator chamber by withdrawal means 140 and hydrocarbon reaction products are removed from the upper portion of the reactor-separator chamber by withdrawal means 140.

When employing the apparatus herein described for the conversion of hydrocarbon feed materials a relatively dense fluid bed of catalytic material is maintained in the lower portion of the regeneration zone at an elevated temperature in the range of from about 1100 to about 1200° F. Relatively hot catalytic material is withdrawn from the regeneration zone and combined with fresh hydrocarbon feed material to form a mixture at an elevated conversion temperature of at least about 900° F., and the temperature may be as high as 1025° F., which is passed as a suspension upwardly through at least one first riser-reactor terminating in the upper portion of the separation zone at a velocity in the range of from about 20 to about 60 feet per second and a catalyst density in the range of from about 2 to about 15 lbs./cu. ft. Thereafter, the suspension is discharged into the enlarged separation chamber 2. Due to a substantial reduction in the velocity of the catalyst hydrocarbon mixture discharged from the riser into the upper portion of the enlarged separator chamber or zone, catalytic material separates from hydrocarbon products by settling and falls into the reactor chamber therebelow to form a relatively dense fluid bed of catalytic material having an upper dense phase level below the discharge of the riser-reactor. Simultaneously with the above, a second hydrocarbon feed material such as recycle hydrocarbon material is mixed with hot catalytic material withdrawn from a regenerator and passed as a suspension at an elevated conversion temperature in the range of from about 800° F. to about 950° F., upwardly through a separate second riser-reactor at an initial velocity of about 40 feet per second and then into the enlarged portion thereof wherein the velocity of the upwardly flowing suspension is substantially reduced to a velocity in the range of from about 3.5 to about 6.0 feet per second and at least sufficient to carry the catalytic material introduced thereto upwardly to the top of the riser for discharge through grid 20 into the lower portion of the reactor chamber. Accordingly, the second riser-reactor may be at least about 1.5 times larger in diameter in the upper portion thereof than in the lower portion and the maximum diameter is maintained below that which will maintain the superficial velocity of the gasiform material passing upwardly therethrough above about 3.5 feet per second. By this arrangement, the catalyst density in the upper portion of the recycle riser will be substantially more dense than in the lower portion, but not sufficiently dense to exclude substantially continuous upflow of catalytic material therethrough and the combination of this arrangement with controlling the upper level of the dense catalyst bed within the reactor chamber as desired enables one to control the extent of conversion over a relatively wide range. As discussed hereinbefore, the upper level of the fluid bed of catalytic material in the reactor chamber may be maintained above, below or at substantially the same level as the discharge means 20 of riser 12 whereby additional contact time of hydrocarbon reactant with catalyst discharged from the risers may be obtained within the range of from about 3 seconds to about 60 seconds and the extent of conversion of the hydrocarbon material controlled over a relatively wide range. In addition, it is contemplated varying the temperature within the riser 12, as well as the temperature of the bed of catalytic material maintained within the reactor chamber over a relatively wide range of from about 850° F. to about 1000° F. More usually an average temperature of about 875° F. will be maintained in riser 12. The catalytic material discharged from the plurality of riser-reactors and combined with both volatile and non-volatile carbonaceous material is maintained in a fluid-like condition in the lower portion of the reactor chamber by the introduction of a vaporizable and/or gaseous material to the lower portion of the annular bed surrounding the upper end of riser 12. Superficial gas velocities in the range of from about 0.1 foot per second to about 2.5 feet per second may be employed in the annular fluid bed, however, it is preferred to employ as low a velocity as permissible to maintain the catalytic material in a fluid-like condition for flow to withdrawal conduit 38. Thereafter, the catalytic material at least partially stripped of volatile hydrocarbon material is withdrawn and passed to a segregated stripping section more fully discussed hereinafter. In one embodiment of this invention catalytic material withdrawn by standpipe 38 from the annular bed of catalytic material in the lower portion of the reaction zone is passed to the lower portion of an upflow dilute phase mixing zone wherein the catalytic material is mixed with additional stripping gas and passed as a dilute phase suspension upwardly therethrough and discharged from the upper portion of the dilute phase mixing zone through one or more discharge slots which substantially alters the vertical velocity component of the suspension for separation and passage of the catalytic material into a second annular relatively dense fluid bed of catalytic material. The catalytic material in the second annular fluid bed is caused to flow generally horizontally through each side of the annular stripper around the enlarged central riser-reactor to a common withdrawal standpipe on the opposite side of the annular stripper from which the catalytic material is introduced. In another embodiment of this invention the catalytic material withdrawn by standpipe 38 is discharged directly into the second annular bed of catalytic material without first passing through the dilute phase mixing zone discussed above. In the second annular stripper the catalytic material moves as a relatively dense fluid bed generally horizontally through the annular stripper while in contact with stripping gas introduced to the bottom or lower portion of the fluid bed substantially throughout the total length of the annular stripper. By this arrangement and flow of catalytic material the catalyst containing entrained hydrocarbonaceous material may be considered to be subjected to an incremental number of vertical stripping sections wherein it is progressively contacted with fresh stripping gas under elevated temperature decomposition conditions. In addition to the above, the catalytic material in the segregated annular fluid bed may be in indirect heat exchange with the centrally positioned riser-reactor and in another embodiment of this invention the segregated annular bed of catalytic material may be in indirect heat exchange with the upper portion of the regeneration zone throughout substantially its vertical height. In any of these embodiments gaseous stripping material recovered from the upper portion of the dilute phase mixing zone and/or the segregated annular stripping zone is passed to the upper portion of the separation zone and above the uppermost riser discharge through one or more open end substantially unrestricted vent conduits. The gaseous material discharged from the vent conduits in the upper portion of the separation zone is generally of a relatively large quantity sufficient to be employed as flushing or anti-coking steam therein to minimize the formation of carbonaceous deposits in the upper portion of the separator chamber. Catalytic material containing non-strippable hydrocarbonaceous deposits is removed from the segregated annular stripping zone and passed as a confined stream to a fluid bed of catalytic material in the lower portion of a regeneration zone wherein non-strippable hydrocarbonaceous material is removed from the catalyst by burning in the presence of an oxygen-containing gas, thereby heating the catalyst to an elevated temperature up to about 1125° F. and sufficiently high for recycle to the plurality of riser-reactors discussed hereinbefore.

The improved method and arrangement of stripping steps described herein permits maintaining the catalyst containing hydrocarbonaceous material at an elevated temperature for an extended period of time of at least about 1 minute, more usually from about 1.5 minutes up to about 4 minutes to effect decomposition of residual hydrocarbon materials adsorbed on the catalyst while progressively stripping the catalyst with fresh stripping gas in a relatively large number of incremental stripping stages. In addition, maximum advantage of a fluid bed with respect to heat transfer and intermixing is advantageously employed in the latter stripping stage.

As a means for better understanding the improved apparatus and method of operation employing the apparatus of this invention, the following table of data is presented by way of example.

| | |
|---|---|
| Separator **2**: | |
| Temperature upper portion | 940° F. |
| Pressure | 10 lb. |
| Vapor velocity | 2.1 ft./sec. |
| Diameter | 26 ft. I.D. |
| Dense bed reactor **4**: | |
| Temperature catalyst bed | 900° F. |
| Catalyst density bed | 35 lb./cu. ft. |
| Diameter | 16 ft. I.D. |
| Regenerator **8**: | |
| Temperature | 1125° F. |
| Pressure | 19.0 p.s.i.g. |
| Catalyst density (bed) | 30 lb./cu. ft. |
| Diameter | 35 ft. I.D. |
| Riser **24**: | |
| Temperature | 985° F. |
| Superficial velocity | 60 ft./sec. at top. |
| Diameter | 27 in. I.D. |
| Catalyst density (average) | 5.7 lb./cu. ft. |
| Riser **12**: | |
| Temperature at outlet | 800° F. |
| Superficial velocity lower portion | 40 ft./sec. |
| Superficial velocity upper portion | 4.4 ft./sec. |
| Diameter lower portion | 30 in. I.D. |
| Diameter upper portion | 8 ft. I.D. |
| Catalyst residence time in maximum diameter portion | 8 sec. |
| Catalyst density (average) | 5.1 lb./cu. ft. |
| Dilute phase stripper: | |
| Temperature | 900° F. |
| Superficial velocity | 16.7 ft./sec. at outlet |
| Segregated annular stripper: | |
| Temperature | 900° F. |
| Catalyst density | 35 lb./cu. ft. |
| Diameter outer | 16 ft. I.D. |
| Diameter inner | 8 ft. I.D. (approx.) |
| Pressure (top) | 10.5 p.s.i.g. |
| Catalyst residence time | 62 sec. |
| Superficial vapor velocity above bed | 1.0 ft./sec. |

It is contemplated in an embodiment of this invention of separating or dividing the distributor means positioned in the lower portion of the annular stripping chamber into a plurality of segments for separate and independent flow control of stripping gas therethrough. That is, the distributor means in the lower portion of the annular stripping chamber may be separated into a plurality of separate stripping gas distributor means which may be independently controlled with respect to the rate of flow of stripping gas therethrough. By this arrangement the velocity of the stripping gas passing upwardly through the contact material in the annular stripper may be independently controlled as desired over a relatively wide range, thereby permitting changing or maintaining the catalyst bed density the same or of different density within sections of the annular stripper, as desired.

Having thus described the improved method and preferred arrangements of apparatus of this invention, as well as presented specific examples thereof, it is to be understood that many modifications may be made thereto without departing from the spirit thereof and no undue limitations are to be implied in view of the specific examples presented herein.

We claim:

1. An apparatus for catalytically cracking hydrocarbon material comprising in combination, a reactor-separator chamber situated above a regenerator chamber, said reactor-separator chamber being of larger diameter in the upper portion thereof than in the lower portion, a substantially vertical first riser conduit extending upwardly from within the lower portion of said regenerator chamber into and terminating in the lower portion of said reactor-separator chamber to form an annular space therewith, the terminus of said first riser conduit being capped with a perforated baffle member, at least one second riser conduit extending substantially vertically upwardly from within the lower portion of said regenerator chamber into the upper portion of said reactor-separator chamber, an annular stripping chamber positioned between said reactor-separator chamber and said regenerator chamber and having a maximum diameter substantially equal to the diameter of the lower portion of said reactor-separator chamber, a first conduit means provided with a valve means in the lower portion thereof extending downwardly from the lower portion of said annular space into one side of said annular stripping chamber, a second conduit means communicating between the opposite side of said annular stripping chamber from said first conduit means and the lower portion of a regenerator chamber, separate means for introducing gaseous material to the lower portion of said annular space and said annular stripping chamber, means for introducing subdivided contact material withdrawn from said regenerator chamber with a first reactant material into the bottom portion of said first riser conduit, means for introducing subdivided contact material withdrawn from said regenerator chamber with a second reactant material into the bottom portion of said second riser conduit, at least one open end conduit communicating between the upper portion of said annular stripping chamber and the upper portion of said reactor-separator chamber, and means for removing gaseous material from the upper portion of each of said regenerator chamber and said reactor-separator chamber.

2. The apparatus of claim 1 wherein said first conduit means terminates in the upper portion of said annular stripping chamber.

3. The apparatus of claim wherein said first conduit means terminates in the lower portion of said annular stripping chamber and is surrounded by an elongated semi-circular substantially vertical baffle member which extends from the lower portion of said annular stripping chamber to the upper portion thereof to form an annular dispersed phase mixing chamber therewith.

4. An apparatus for catalytically cracking hydrocarbon material comprising in combination a separator chamber, a reactor chamber positioned below said separator chamber and in open communication in the upper portion with the bottom portion of said separator chamber, a stripping chamber positioned beneath said reactor chamber, a regenerator chamber of larger diameter than said reactor chamber positioned beneath said reactor chamber so that a major portion of said stripping chamber is confined within the upper portion of said regenerator chamber, a first substantially vertical riser conduit extending from the lower portion of said regenerator chamber upwardly through said stripping chamber into said reactor chamber and terminating above the bottom of said reactor chamber, said first riser conduit being substantially enlarged in diameter relative to the lower portion thereof in the upper portion thereof where it passes through said stripping chamber to form an annular stripping chamber of large diameter relative to said first riser conduit, the top of said first riser conduit being capped with a perforated baffle member, said first riser conduit forming an annular space with said reactor chamber in the lower portion thereof, at least one second riser conduit extending from the lower portion of said regenerator chamber upwardly into the lower portion of said separator chamber, at least one open end conduit communicating between the upper portion of said annular stripping chamber and the upper portion of said separator chamber, at least one first standpipe communicating between the bottom portion of said annular space and said annular stripping chamber, at least one second standpipe diametrically disposed with respect to said first standpipe and communicating between the bottom portion of said annular stripping chamber and the lower portion of said regenerator chamber, means for separately introducing gasiform material to the bottom portion of each of said riser reactors, said annular space, said annular stripping chamber and said regenerator chamber, and means for separately removing gasiform material from the upper portion of each of said separator chamber and said regenerator chamber.

5. A unitary vessel for catalytically cracking hydrocarbon material comprising in combination an upper cylindrical separator chamber, an intermediate cylindrical section of smaller diameter than said separator chamber comprising an upper reactor chamber in open communication with said separator chamber and a annular stripping chamber in the lower portion of said intermediate cylindrical section, a cylindrical regenerator chamber of larger diameter than said separator chamber in the lower portion of said vessel, said annular stripping chamber formed by a coaxially positioned first riser conduit of larger diameter in the upper portion than in the lower portion extending from the lower portion of the regenerator chamber upwardly into and discharging within the lower portion of said reactor chamber to form an annular space in the lower portion of the reactor chamber, the upper portion of said first riser conduit within said reactor chamber being expanded gradually outwardly and capped by a perforated grid member to form a discharge means, a first standpipe extending downwardly from the bottom portion of said annular space into said annular stripping chamber, at least one open end conduit extending substantially vertically from the upper portion of said annular stripping chamber into the upper portion of said separator chamber, at least one second riser conduit extending from the lower portion of said regenerator chamber substantially vertically upwardly into the lower portion of said separator chamber and externally to said intermediate cylindrical section, at least one second standpipe diametrically disposed with respect to said first standpipe extending downwardly from the bottom portion of said annular stripping chamber to the lower portion of said regenerator chamber, cyclone separator means disposed in the upper portion of said separator chamber and said regenerator chamber, means for separately introducing gaseous material to the bottom portion of said annular space and said annular stripping chamber, means for introducing gaseous material to the lower portion of said regenerator chamber, means for introducing gasiform material to the bottom portion of each of said riser conduits, means for removing gaseous material from the upper portion of said regenerator chamber and means for removing gasiform material from the upper portion of said separator chamber.

6. The apparatus of claim 5 wherein said first standpipe extends downwardly into the lower portion of a segmented well within said annular stripping chamber of larger diameter than said standpipe, said well extending upwardly into the upper portion of said annular stripping chamber and provided with open discharge means in the upper periphery which discharge outwardly into said annular stripping chamber on each side of said well and means for introducing gaseous material to the lower portion of said well for flow upwardly around said standpipe to said open discharge means.

7. The apparatus of claim 5 wherein the bottom of said annular stripping chamber and the bottom of the enlarged portion of said first riser conduit is formed by a common frusto conical baffle member which is rigidly attached at its upper periphery to the bottom of a cylindrical wall defining said intermediate cylindrical section and at its lower periphery to the portion of the first riser-reactor which is of smaller diameter than the upper portion, and the top of said regenerator chamber is formed by an inverted dish shaped baffle member which is rigidly attached to the cylindrical wall defining the intermediate cylindrical section of the vessel above the upper periphery of said frusto conical baffle member.

8. The apparatus of claim 5 wherein said second riser conduit extends into said separator chamber through a frusto conical baffle member forming the transition between the cylindrical separator chamber and the intermediate cylindrical section of smaller diameter than said cylindrical separator chamber and said reactor chamber is separated from said annular stripping chamber by a dish shaped baffle member.

9. A system for handling finely divided contact material comprising in combination a reactor chamber containing a fluid bed of contact material in the lower portion thereof, an annular stripping chamber containing a fluid bed of contact material in the lower portion thereof and a regenerator chamber containing a fluid bed of contact material therein, at least one confined means for passing contact material withdrawn from said regenerator chamber with a first reactant material into the reactor chamber and above the fluid bed of contact material therein, at least one second conduit means for passing contact material from said regenerator chamber with a second reactant material into said fluid bed in said reactor chamber, conduit means for passing contact material from said reactor chamber into a first segment of said annular stripping chamber, means for horizontally flowing contact material through said annular stripping chamber from said first segment to a segment diametrically disposed with respect to said first segment, means for withdrawing contact material from said diametrically disposed segment of said annular chamber for passage as a confined stream to said regenerator chamber, and conduit means for passing contact material withdrawn from said regenerator chamber directly into said annular chamber for admixture with said contact material passed to one end of said annular chamber.

10. An apparatus for catalytically cracking hydrocarbon material comprising in combination, a reactor chamber, an annular stripping chamber and a regenerator chamber, said annular stripping chamber positioned above said regenerator chamber, a riser conduit extending upwardly from the lower portion of said regenerator chamber and discharging into a first segment of said annular stripping chamber, means for horizontally flowing catalyst through said annular stripping chamber from said first segment to a segment diametrically disposed with respect to said first segment, a standpipe extending downwardly from the diametrically disposed segment of said annular stripping chamber into said regenerator chamber, a plurality of elongated confined reactor means extending upwardly into said reactor chamber and communicating with said regenerator chamber, conduit means extending from said reactor chamber into said annular chamber which discharges adjacent to the discharge of said riser conduit and separated from said standpipe by said annular stripping chamber, means for passing gaseous material from the upper portion of said stripping chamber to the upper portion of said reactor chamber, means for introducing gasiform material to the lower portion of said reactor chamber and said annular stripping chamber, means for recovering gasiform material from the upper portion of said reactor chamber and means for introducing gaseous material to the lower portion of said regenerator chamber and recovery of said gaseous material from the upper portion thereof.

11. An apparatus for catalytically cracking hydrocarbon material comprising in combination a reactor chamber, a stripping chamber of smaller diameter than said reactor chamber, a regenerator chamber of larger diameter than said reactor chamber, a first standpipe extending from substantially the bottom of said reactor chamber and discharging into one side of said stripping chamber, an open end conduit communicating between substantially the top of said stripping chamber and the upper portion of said reactor chamber, a riser conduit of larger diameter in the upper portion extending upwardly into and terminating within said stripping chamber to form an annular stripping chamber, said riser discharging into the upper portion of said annular stripping chamber and substantially adjacent to the discharge of said first standpipe, means for horizontally flowing catalyst through said stripping zone from said riser to a second standpipe, said second standpipe separated from said first standpipe by said annular stripping chamber extending downwardly from the lower portion of another quadrant of said annular stripping chamber from that occupied by said first standpipe and communicating with said regenerator chamber, a plurality of elongated confined reactor conduits communicating between said regenerator chamber and said reactor chamber and means for introducing gasiform material to the lower portion of said chambers and recovery of said gasiform material from the upper portion of said chambers.

*12. A method for stripping subdivided catalytic material combined with volatile and non-volatile carbonaceous material which comprises contacting catalytic material combined with volatile and non-volatile carbonaceous material with a relatively inert gaseous material in a first relatively dense fluid bed of catalytic material, passing partially stripped catalytic material from the bottom portion of said first dense fluid bed into a dilute phase mixing zone, admixing such material with stripping gaseous material to form a relatively dilute suspension flowing upwardly through said dilute phase mixing zone, discharging such suspension of catalytic material and gaseous stripping material from said dilute phase mixing zone above a first annular zone containing a second relatively dense fluid bed of catalytic material containing hydrocarbonaceous material, introducing stripping gaseous material to the lower portion and substantially throughout the total length of said first annular zone as the fluid dense bed of catalytic material maintained therein is flowed generally horizontally through said first annular zone to a catalyst withdrawal passageway, combining stripping gaseous material recovered from above the second fluid dense bed of catalytic material in said first annular zone with stripping gaseous material recovered from above the first dense fluid bed of catalytic material and passing stripped catalytic material withdrawn through*

*13. A method for recovering difficultly vaporizable hydrocarbon materials entrained with finely divided catalytic material employed in a hydrocarbon conversion process which comprises contacting the lower portion of a bed of finely divided catalytic material containing entrained hydrocarbon conversion products in a reaction zone with sufficient relatively inert gaseous material to maintain the bed of catalytic material in a dense fluidized condition and effect partial stripping of hydrocarbon material from the catalytic material, withdrawing catalytic material from the lower portion of said dense fluidized bed, withdrawing gaseous material from the upper portion of said dense fluidized bed, passing partially stripped catalytic material from the bottom portion of said dense fluidized bed into a dilute phase mixing zone, admixing such material with stripping gaseous material to form a relatively dilute suspension flowing upwardly through said dilute phase mixing zone, discharging catalytic material withdrawn from said dense fluidized bed to one end of*

*a relatively large diameter annular stripping zone separate from said dense fluidized bed, maintaining catalytic material in said annular stripping zone in a relatively dense fluidized condition by introducing gaseous stripping material to the lower portion thereof for upward flow therethrough and moving the dense fluidized catalytic material generally horizontally through the annular stripping zone to a catalytic material withdrawal passageway at the opposite end of said annular stripping zone, recovering gaseous stripping material and stripped hydrocarbon material from above the bed of catalytic material in said annular stripping zone and combining the thus recovered materials with gaseous material above the fluid bed of catalytic material in the reaction zone.*

*14. A method for the recovery of valuable hydrocarbon materials entrained with finely divided catalytic material employed in a hydrocarbon conversion process which comprises subjecting finely divided catalytic material containing valuable hydrocarbon materials adsorbed thereon progressively to fresh stripping gas in a relatively large number of incremental stripping sections by the combination of steps including, treating a dense fluidized bed of catalytic material countercurrently with gaseous material for the recovery of easily stripped hydrocarbon materials from the catalytic material, withdrawing partially stripped catalytic material from said dense fluidized bed, passing the partially stripped catalytic material into a dilute phase mixing zone, admixing such material with additional stripping gas to form a relatively dilute suspension flowing upwardly through said dilute phase mixing zone, discharging such suspension into a semicircular annular stripping zone wherein the catalytic material is maintained for an extended period of time in a relatively dense fluidized condition under elevated temperature conditions suitable for decomposition of residual hydrocarbon materials on the catalytic material as it moves generally horizontally through said semicircular annular stripping zone, introducing stripping gas to the lower portion of said horizontally moving fluidized bed of catalytic material for flow upwardly therethrough, recovering stripped catalytic material from the opposite end of said semicircular annular stripping zone to which it was introduced and combining stripped hydrocarbon materials and stripping gas recovered from the upper portion of said annular fluid bed with gaseous material recovered from said first dense fluid bed phase.*

*15. A method for the conversion of hydrocarbon feed materials and the recovery of valuable hydrocarbon material entrained with the catalyst which comprises passing a first hydrocarbon feed with finely divided catalyst as a suspension under elevated temperature conversion conditions through at least one elongated confined first reaction zone, discharging catalyst and hydrocarbon conversion products from said first reaction zone under conditions to effect at least partial separation of catalyst from hydrocarbon conversion products with the thus separated catalyst forming a relatively dense fluid bed of catalytic material in the lower portion of an enlarged reaction zone, passing a second hydrocarbon feed material with finely divided catalyst under elevated temperature conversion conditions upwardly through a second elongated confined reaction zone, discharging catalyst and hydrocarbon material from said second elongated reaction zone under conditions to separate catalyst from hydrocarbon material and form said relatively dense bed of catalyst about the upper end of said second elongated confined reaction zone, maintaining catalyst in said relatively dense fluid bed under elevated temperature conversion conditions to effect partial decomposition of hydrocarbon material retained on said catalyst, introducing a vaporizable material to the lower portion of said relatively dense fluid bed of catalyst for flow upwardly therethrough, withdrawing catalyst from the lower portion of said relatively dense fluid bed, passing partially stipped catalytic material from the bottom portion of said relatively dense fluid bed into a dilute phase mixing zone, admixing such material with stripping gaseous material to form a relatively dilute suspension flowing upwardly through said dilute phase mixing zone, discharging catalyst from said dilute phase mixing zone to one end of an annular bed of catalyst in an annular stripping zone, maintaining said annular bed of catalyst in a relatively dense fluidized condition by the introduction of gaseous stripping material to the lower portion thereof and moving the annular fluid bed of catalyst generally horizontally through said annular stripping zone while being contacted with a relatively large number of increments of fresh stripping gas to a catalyst withdrawal passageway at the opposite end of said annular stripping zone, said annular stripping zone surrounding a lower portion of said second elongated confined reaction zones, withdrawing stripped catalyst through said withdrawal passageway and passing it to a relatively dense fluid bed of catalyst in a regeneration zone, regenerating catalyst in said regeneration zone under conditions to heat said catalyst to an elevated temperature and passing regenerated catalyst in an elevated temperature to said elongated confined reaction zones.*

*16. A method for the conversion of hydrocarbon feed material in the presence of finely divided catalytic material which comprises passing catalytic material with a first hydrocarbon feed material under elevated temperature conversion conditions as a first suspension upwardly through an elongated confined first conversion zone, said first suspension being substantially more dense in the upper portion of said first confined zone than in the lower portion thereof, discharging catalytic material and hydrocarbon material from said first conversion zone above the lower portion of a relatively dense fluid bed of catalytic material in a reaction zone, introducing fluidizing material to the lower portion of said fluid bed of catalytic material, passing catalytic material with a second hydrocarbon feed material upwardly through a second elongated confined reaction zone under temperature conversion conditions above that employed in said first conversion zone, discharging catalytic material and hydrocarbon conversion products from said second conversion zone above said relatively dense fluid bed of catalytic material, separating catalytic material from hydrocarbon conversion products above the fluid bed of catalytic material and passing the thus separated catalytic material into said fluid bed, passing catalytic material containing entrained hydrocarbon materials from said fluid bed into a dilute phase mixing zone, admixing such material with gaseous stripping material to form a relatively dilute suspension flowing upwardly through said dilute phase mixing zone under conditions to effect separation of entrained hydrocarbon material from catalytic material, passing catalytic material from said dilute phase mixing zone into one end of an elongated horizontally disposed stripping zone, maintaining such catalytic material in said elongated stripping zone as a relatively dense fluidized bed which moves laterally therethrough while incrementally introducing fresh gaseous stripping material to the lower portion and throughout substantially the total length thereof, the residence time of said contaminated fluid bed of catalytic material in said horizontal stripping zone being sufficient to effect further recovery of entrained hydrocarbon materials from catalytic material, recovering stripped catalytic material from the opposite end of said horizontal stripping zone, passing the stripped catalytic material to a regeneration zone wherein non-strippable hydrocarbon materials are removed from the catalyst by burning thereby heating the catalytic material to an elevated temperature and thereafter returning the thus treated catalytic material at an elevated temperature to each of said elongated confined conversion zones.*

*17. A method for cracking hydrocarbon feed materials in the presence of finely divided catalyst and the recovery of valuable hydrocarbon adsorbed on and entrained with the catalyst which comprises passing a first suspension of*

*catalyst and fresh hydrocarbon feed material at a temperature of at least about 900° F. upwardly through at least one first elongated riser cracking zone and discharging such suspension in said first riser cracking zone into an enlarged separation zone under conditions to effect at least partial separation of catalyst from hydrocarbon conversion products thereby forming a relatively dense fluid bed of catalyst in the lower portion of the separation zone maintained in a fluid condition by the introduction of fluidizing gasiform material to the lower portion thereof, passing a second suspension of catalyst and hydrocarbon reactant material at an elevated conversion temperature below about 1000° F. upwardly through a second riser cracking zone which terminates within the lower portion of said separation zone, discharging catalyst and hydrocarbon product material from said second riser cracking zone into the lower portion of said separation zone, withdrawing hydrocarbon product material from the upper surface of said dense fluid bed of catalyst in said separation zone and passing it upwardly through a dilute phase of catalyst discharged from at least one riser-reactor zone at a higher temperature than said dense phase of catalyst, withdrawing hydrocarbon conversion products from the upper portion of said separation zone, withdrawing catalyst combined with hydrocarbon material from said dense fluid bed of catalyst for passage to at least an annular stripping zone, introducing contaminated catalyst to one end of said annular stripping zone, maintaining the catalyst introduced to said annular stripping zone in a relatively dense fluidized condition as it moves generally horizontally through the annular stripping zone while introducing gaseous stripping material to the lower portion thereof, recovering catalyst from the opposite end of said annular stripping zone after prolonged treatment at elevated hydrocarbon decomposition temperatures, recovering hydrocarbon decomposition product material and stripping gas from the upper portion of said annular bed of catalyst, passing the thus recovered hydrocarbon decomposition product material to the upper portion of said separation zone, passing the recovered catalyst from said annular stripping zone to a regeneration zone and returning regenerated catalyst to said riser cracking zone.*

*18. The method of claim 17 wherein the annular stripping zone is in indirect heat exchange with said second riser cracking zone.*

*19. The method of claim 17 wherein the annular stripping zone is in indirect heat exchange with said second riser cracking zone and said regeneration zone.*

*20. The method of claim 17 wherein the second riser cracking zone is substantially enlarged in the upper portion thereof to effect a substantial reduction in the vertical velocity of the suspension passing upwardly therethrough.*

*21. The method of claim 17 wherein the second riser cracking zone discharges above the dense fluid bed of catalyst in the lower portion of the separation zone.*

*22. The method of claim 17 wherein the second riser cracking zone discharges below the upper dense phase level of the fluid bed of catalyst in the lower portion of the separation zone.*

*23. The method of claim 17 wherein the catalyst withdrawn from the dense fluid bed of catalyst in the separation zone is passed through an upflow dilute phase mixing zone prior to introduction to said annular stripping zone.*

*24. The method of claim 17 wherein catalyst withdrawn from said dense bed of catalyst in said separation zone is passed directly to said annular stripping zone.*

*25. The method of claim 17 wherein stripped hydrocarbon decomposition products and stripping gas are passed from the upper portion of the annular stripping zone to the upper portion of the separation zone and above the discharge of said first riser cracking zone through at least one elongated open end confined passageway.*

*26. A method for converting hydrocarbon feed materials in the presence of finely divided catalytic material and the recovery of hydrocarbon products therefrom which comprises passing hydrocarbon reactant materials with finely divided catalyst at a suspension upwardly through a plurality of separate elongated confined reaction zones maintained under elevated temperature conversion conditions which terminate in a reaction zone and above the lower portion of a relatively dense fluid bed of catalyst in the lower portion thereof, passing a fluidizing material upwardly through said relatively dense bed of catalyst, recovering hydrocarbon conversion products from the upper portion of said reaction zone, passing catalyst containing entrained hydrocarbon material from said dense fluidized bed of catalyst to a separate annular stripping zone, passing catalyst containing entrained hydrocarbon material in a relatively dense fluidized condition in the presence of gaseous stripping material introduced to the lower portion thereof generally horizontally through said annular stripping zone, maintaining said annular stripping zone at an elevated temperature by the introduction of regenerated catalyst directly thereto, withdrawing stripped catalyst from the opposite end of said annular stripping zone from which it was introduced, recovering stripped hydrocarbon material and stripping gas from the upper portion of said annular stripping zone, passing withdrawn stripped catalyst to a regeneration zone and passing regenerated catalyst to said elongated confined reaction zones.*

*27. A method for cracking hydrocarbon feed material in the presence of a cracking catalyst which comprises passing at least one first suspension of hydrocarbon reactant and catalyst through a first elongated cracking zone discharging above a fluid bed of catalyst in an enlarged reaction zone, passing a second suspension of hydrocarbon reactant and catalyst through a second elongated cracking zone discharging within said fluid bed of catalyst in said enlarged reaction zone, passing a third hydrocarbon reactant more refractory than that employed in said first suspension upwardly through said fluid bed of catalyst in said enlarged reaction zone, recovering cracked hydrocarbon products from above said fluid bed of catalyst, withdrawing catalyst from said fluid bed of catalyst containing entrained and adsorbed hydrocarbon material thereon, mixing freshly regenerated catalyst with said withdrawn catalyst and passing the mixture in a relatively dense fluidized condition generally horizontally through an elongated confined stripping zone to which gaseous stripping material is introduced throughout substantially the total length thereof, withdrawing stripped hydrocarbon material from said stripping zone and combining it with the cracked hydrocarbon product recovered from above said fluid bed of catalyst in said enlarged reaction zone and withdrawing stripped catalyst for regeneration and return to said cracking zones.*

*28. A method for recovering hydrocarbon product material entrained with and adsorbed on finely divided catalytic material which comprises forming a relatively dense fluid bed of catalytic material containing entrained hydrocarbon material and difficultly decomposable hydrocarbon material adsorbed on the catalytic material, passing a first gasiform material upwardly through said fluid bed and recovering entrained hydrocarbon material therefrom, withdrawing catalytic material from said first fluid bed, combining said withdrawn catalytic material with hot freshly regenerated catalytic material to form a relatively dense fluid annular bed of catalytic material at an elevated temperature which moves generally horizontally through an elongated annular stripping zone in the presence of gaseous material introduced to the lower portion thereof, decomposing said difficultly decomposable hydrocarbon material in said annular bed in the presence of gaseous stripping material introduced to the lower portion thereof, withdrawing catalytic material from the opposite end of said elongated annular stripping zone from which it was introduced for passage to a regeneration zone and com-*

*bining hydrocarbon material and stripping gas recovered from above the fluid bed of catalyst in said annular zone with entrained hydrocarbon material recovered from said first fluid bed.*

References Cited by the Examiner

The following references, cited by the Examiner, are of record in the patented file of this patent or the original patent.

UNITED STATES PATENTS

| | | | |
|---|---|---|---|
| 2,672,407 | 3/1954 | Leffer | 23—288 |
| 2,871,186 | 1/1959 | Francisco et al. | 208—147 |

| | | | |
|---|---|---|---|
| 2,871,188 | 1/1959 | Francisco et al. | 252—8.5 |
| 2,900,325 | 8/1959 | Rice et al. | 208—78 |
| 2,962,362 | 11/1960 | Moorman | 23—288 |
| 3,011,969 | 12/1961 | Mader | 208—150 |
| 3,053,641 | 9/1962 | Nagy et al. | 23—288 |
| 3,053,643 | 9/1962 | Osborne | 23—288 |
| 3,053,752 | 9/1962 | Swanson | 208—78 |
| 3,053,753 | 9/1962 | Slyngstad et al. | 208—78 |

DELBERT E. GANTZ, *Primary Examiner.*

H. LEVINE, *Assistant Examiner.*